US012298155B2

(12) United States Patent
Colombo

(10) Patent No.: US 12,298,155 B2
(45) Date of Patent: May 13, 2025

(54) INDUCTIVE POSITION SENSOR DEVICE

(71) Applicant: ams Sensors Singapore Pte. Ltd., Singapore (SG)

(72) Inventor: Matteo Colombo, Verrua Po (IT)

(73) Assignee: AMS SENSORS SINGAPORE PTE. LTD., Singapore (SG)

(*) Notice: Subject to any disclaimer, the term of this patent is extended or adjusted under 35 U.S.C. 154(b) by 164 days.

(21) Appl. No.: 18/010,638

(22) PCT Filed: May 31, 2021

(86) PCT No.: PCT/SG2021/050300
§ 371 (c)(1),
(2) Date: Dec. 15, 2022

(87) PCT Pub. No.: WO2021/262091
PCT Pub. Date: Dec. 30, 2021

(65) Prior Publication Data
US 2023/0228597 A1 Jul. 20, 2023

(30) Foreign Application Priority Data
Jun. 24, 2020 (EP) .................................. 20182028

(51) Int. Cl.
G01D 5/20 (2006.01)
(52) U.S. Cl.
CPC .................. G01D 5/2053 (2013.01)
(58) Field of Classification Search
CPC ........ B62D 6/10; G01D 5/2053; G01L 3/105; G01L 5/221; G01L 1/00; G01L 3/00;
(Continued)

(56) References Cited

U.S. PATENT DOCUMENTS 5,134,397 A 7/1992 Everly et al.
5,241,268 A * 8/1993 Lee ..................... G01D 5/2073
324/207.17
(Continued)

FOREIGN PATENT DOCUMENTS

EP 0555987 B1 12/1996
EP 0974823 A2 1/2000
(Continued)

OTHER PUBLICATIONS

Extended European Search Report dated Dec. 3, 2020, EP Application No. 20182028.9, 7 pages.
(Continued)

Primary Examiner — Feba Pothen
Assistant Examiner — Brent J Andrews
(74) Attorney, Agent, or Firm — MH2 Technology Law Group LLP

(57) ABSTRACT

An inductive position sensor device includes at least a first terminal to couple the position sensor device with a first receiving antenna coil for providing a first reception signal, and at least a second terminal to couple the position sensor device with a second receiving antenna coil for providing a second reception signal. The device further includes a unique receiver channel to evaluate the first and second reception signal, and a multiplexer. The multiplexer is configured to selectively couple the at least one first terminal or the at least one second terminal with the unique receiver channel in dependence on operating the multiplexer in a first or second operation state.

12 Claims, 4 Drawing Sheets

(58) Field of Classification Search
CPC ..... G01L 5/00; G01L 7/00; G01L 9/00; G01L 11/00; G01L 13/00; G01L 15/00; G01L 17/00; G01L 19/00; G01L 21/00; G01L 23/00; G01L 25/00; G01L 27/00
See application file for complete search history.

(56) References Cited

U.S. PATENT DOCUMENTS

| | | |
|---|---|---|
| 6,513,394 B1 | 2/2003 | Gutjahr et al. |
| 2014/0055129 A1* | 2/2014 | O'Neil ................. G01D 5/2291 324/207.17 |
| 2016/0202089 A1 | 7/2016 | Leoncavallo et al. |
| 2019/0033097 A1 | 1/2019 | Sorensen et al. |

FOREIGN PATENT DOCUMENTS

| | | |
|---|---|---|
| EP | 2700909 A1 | 2/2014 |
| WO | WO 0216745 A2 * | 2/2002 |
| WO | 2007000653 A1 | 1/2007 |

OTHER PUBLICATIONS

Kamenicky et al., "An inductive position sensor ASIC", Published 2008, https://www.semanticscholar.org/paper/An-Inductive-Position-Sensor-ASICKamenick%C3%BDHorsk%C3%BD/b1132e088aef51d03085e64fe47ced98b0598d5f, 3 pages.
International Search Report and Written Opinion in corresponding International Application No. PCT/SG2021/050300 mailed on Jun. 18, 2021, 10 pages.

* cited by examiner

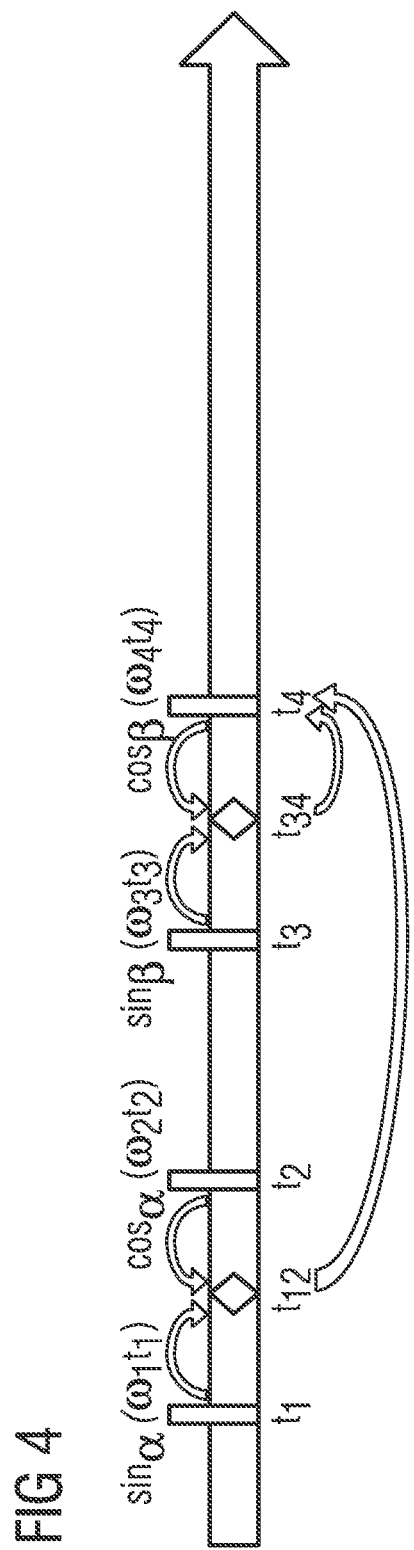

INDUCTIVE POSITION SENSOR DEVICE

CROSS-REFERENCE TO RELATED APPLICATIONS

The present application is the national stage entry of International Patent Application No. PCT/SG2021/050300, filed on May 31, 2021, and published as WO 2021/262091 A1 on Dec. 30, 2021, which claims priority to EP Application No. 20182028.9, filed on Jun. 24, 2020, all of which are incorporated by reference herein in their entireties.

TECHNICAL FIELD

The disclosure relates to an inductive position sensor device that may be used, for example, in torque and angle sensing (TAS) applications.

BACKGROUND

An inductive position sensor device may be used as a component of a steering wheel system in automotive applications. In a steering wheel system supporting a driver, a torque acting on a steering shaft has to be determined. The torque value is used to control a power steering motor to assist the driver in steering a vehicle.

The steering shaft comprises an input/inner shaft and an outer shaft. These components are connected by means of a torsion bar. An inductive position sensor device may be provided to detect angular displacement between the inner and outer shaft. The value of angular displacement between the inner and outer shaft is then multiplied by the stiffness of the torsion bar to determine the torque value acting on the steering shaft. The angular displacement between the inner shaft and the outer shaft can be determined by measuring a first angle of torsion $\alpha$ between the inner shaft and the torsion bar, as well as a second angle of torsion $\beta$ between the torsion bar and the outer shaft.

A possible approach for measuring the angles $\alpha$ and $\beta$ is to use two position/angle sensor devices, wherein one position/angle sensor device is calculating the angle $\alpha$ of the inner shaft in relation to the torsion bar, and the other position/angle sensor is calculating the angle $\beta$ of the outer shaft in relation to the torsion bar. In conclusion, the described conventional approach needs at least two separate position sensor devices in place with area and cost related drawbacks.

An inductive position sensor device is basically configured to measure the coupling between an excitation antenna coil (TX) and two receiving antenna coils (RX) via a rotating coupler/target. The receiving antenna coils are formed such that a first one of the receiving antenna coils provides a first reception signal having a sinusoidal shape, and a second one of the receiving antenna coils provides a second reception signal being shaped as a cosinusoidal signal. The inductive coupling between the excitation coil, the rotating coupler/target and the two receiving antenna coils thus leads to two ratio-metric signals shaped as a sinusoidal signal and a cosinusoidal signal that are dependent on the angular position of the rotating coupler/target arranged between the excitation coil and the two receiving antenna coils. The angular position of the rotating target/coupler can be determined by evaluating the relationship between the first and second reception signal.

Each of the two inductive position sensor devices provided for measuring angles $\alpha$ and $\beta$ usually comprises a receiver channel for evaluating the first reception signal/sinusoidal signal and an additional second receiver channel for evaluating the second reception signal/cosinusoidal signal. In conclusion, a steering wheel application using two separate inductive position sensor devices then requires four complete receiver channels in total. Two receiver channels in a first position sensor device are needed to evaluate the respective first and second reception signal for determining angle $\alpha$, and two additional receiver channels in a second position sensor device are needed to evaluate the respective first and second reception signal for determining angle $\beta$.

There is a desire to provide an inductive position sensor device being capable of determining an angular displacement among two components with high precision.

SUMMARY

An embodiment of an inductive position sensor device being configured to determine at least two positions/rotating angles between different components with high precision is specified in claim 1.

According to an embodiment, the inductive position sensor device comprises at least a first terminal to couple the position sensor with a first receiving antenna coil for providing a first reception signal, and at least a second terminal to couple the position sensor with a second receiving antenna coil for providing a second reception signal. The inductive position sensor device further comprises a unique receiver channel to evaluate the first and second reception signal, and a multiplexer. The multiplexer is arranged between the at least one first and second terminal and the unique receiver channel. The multiplexer is configured to selectively couple the at least one first terminal or the at least one second terminal with the unique receiver channel in dependence on operating the multiplexer in a first or second operation state.

The inductive position sensor device is thus embodied for evaluating at least two receiving signals received from at least two receiving antenna coils coupled to the input terminals of the device by using only one/unique receiver channel instead of using a respective receiver channel being assigned to each of the at least first and second terminals. The architecture of the sensor device improves the application in terms of costs and area occupation.

According to a possible embodiment of the inductive position sensor device, the unique receiver channel comprises a demodulator to provide a first demodulated analogue signal, when the multiplexer is operated in the first operation state, and to provide a second demodulated analogue signal, when the multiplexer is operated in the second operation state. The unique receiver channel may further comprise an analogue-to-digital converter being configured to convert the first demodulated analogue signal into a first digital signal, when the multiplexer is operated in the first operation state, and to convert the second demodulated analogue signal into a second digital signal, when the multiplexer is operated in the second operation state.

According to a possible embodiment of the inductive position sensor device, the unique receiver channel comprises an evaluation unit to determine a relationship of the first reception signal and the second reception signal by calculating a relationship of a first signal to be evaluated and a second signal to be evaluated. The first signal to be evaluated is a representation of the first reception signal, and the second signal to be evaluated is a representation of the second reception signal. The evaluation unit is configured to calculate a value of an arctangent-function of the relationship of the first signal to be evaluated and the second signal to be evaluated.

According to a possible embodiment of the inductive position sensor device, the multiplexer is configured to be controlled so that the first reception signal received at the at least one first terminal at a first time is fed into the unique receiver channel in the first operation state of the multiplexer. The multiplexer is further configured to be controlled so that the second reception signal received at the at least one second terminal at a second time is fed into the unique receiver channel in the second operation state of the multiplexer.

According to an advantageous embodiment of the inductive position sensor device, the evaluation unit is configured to calculate a first approximation function approximating the first reception signal. Moreover, the evaluation unit is configured to calculate a second approximation function approximating the second reception signal.

In particular, according to a possible embodiment of the inductive position sensor device, the evaluation unit is configured to calculate a value of the first approximation function at a first intermediate time being between the first time and the second time. The evaluation unit is further configured to calculate a value of the second approximation function at the first intermediate time.

According to an embodiment of the inductive position sensor device, the evaluation unit is configured to calculate a first value of an arctangent-function of the relationship of the value of the first approximation function and the value of the second approximation function at the first intermediate time.

The calculation and evaluation of the first and second approximation function enables a possible error, caused by the time-shared reception and evaluation of the first and second reception signal by the unique receiver channel, to be significantly reduced. The time-shared use of the unique receiver channel causes the evaluation of the first and second reception signal being time-delayed to each other. The inductive position sensor device thus allows to determine a position of a rotating target/coupler with high precision.

According to an embodiment of the inductive position sensor device, the sensor device comprises at least a third terminal to couple the position sensor with a third receiving antenna coil for receiving a third reception signal, and at least a fourth terminal to couple the position sensor with a fourth receiving antenna coil for receiving a fourth reception signal. The multiplexer is configured to selectively couple the at least one third terminal or the at least one fourth terminal with the unique receiver channel in dependence on operating the multiplexer in a third or fourth operation state.

The embodiment of the inductive position sensor device comprising four receiving antenna coils which may be coupled by the multiplexer to the unique receiver channel allows the measurement of a respective position of two rotating targets being arranged between an excitation antenna coil and the four receiving antenna coils. The reception signals for determining the angles α and β can be evaluated by a single inductive position sensor device instead of using at least two separated devices, one for determining the angle α and one further device for determining the angle β. The full receiver chain/receiver channel placed after the multiplexer makes the time-sharing of the position measurement/angular displacement between the inner shaft and the torsion bar, and between the outer shaft and the torsion bar possible. Thus, the inductive position sensor device can be used as a cost-effective torque sensor for torque sensing in a steering wheel applications.

According to a possible embodiment of the inductive position sensor device, the multiplexer is configured to be controlled so that the third reception signal received at the at least one third terminal at a third time is fed into the unique receiver channel in the third operation state of the multiplexer. The multiplexer is further configured to be controlled so that the fourth reception signal received at the at least one fourth terminal at a fourth time is fed into the unique receiver channel in the fourth operation state of the multiplexer.

The inductive position sensor device may thus be used for torque sensing in a steering wheel system in automotive applications by measuring the displacement of two angles among two components, for example an inner and an outer shaft of a steering wheel system. The inductive position sensor device thus provides a solution to determine the position of two devices by using only one inductive position sensor device. In particular, the inductive position sensor provides a cost-effective approach, because it implies not to use four complete receiver channels, wherein two of them are placed in each housing of an inductive position sensor device, but only to use one unique receiver channel in one housing of a single position sensor device to evaluate four reception signals for the complete torque calculation.

According to a possible embodiment of the inductive position sensor device, the evaluation unit is configured to calculate a value of a third approximation function approximating the third reception signal at a second intermediate time being between the third time and the fourth time. The evaluation unit is further configured to calculate a value of a fourth approximation function approximating the fourth reception signal at the second intermediate time.

According to a possible embodiment of the inductive position sensor device, the evaluation unit is configured to calculate a value of an arctangent-function of the relationship of the value of the third approximation function and the value of the fourth approximation function at the second intermediate time.

According to an embodiment of the inductive position sensor device, the evaluation unit is configured to calculate a value of a fifth approximation function approximating the first reception signal at the fourth time and a value of a sixth approximation function approximating the second reception signal at the fourth time. The evaluation unit is further configured to calculate a value of a seventh approximation function approximating the third reception signal at the fourth time and a value of an eighth approximation function approximating the fourth reception signal at the fourth time.

According to an advantageous embodiment of the inductive position sensor device, the evaluation unit is configured to calculate a value of an arctangent-function of the relationship of the value of the fifth approximation function and the value of the sixth approximation function at the fourth time. The evaluation unit is further configured to calculate a value of an arctangent-function of the relationship of the value of the seventh approximation function and the value of the eighth approximation function at the fourth time.

The inductive position sensor device thus allows to calculate a position of a first rotating coupler/target and a position of a second rotating coupler/target, for example a position of an inner shaft and a position of an outer shaft of a steering wheel system, relative to a torsion bar, with high precision, although four reception signals are evaluated by the unique receiver channel in a time-shifted way.

Additional features and advantages of the inductive position sensor device are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWINGS

The accompanying drawings are included to provide further understanding, and are incorporated in, and constitute a part of, the specification. As such, the disclosure will be more fully understood from the following detailed description, taken in conjunction with the accompanying figures in which:

FIG. 4 illustrates an interpolation algorithm to determine a respective position of a first and second object by an inductive position sensor device.

DETAILED DESCRIPTION OF EMBODIMENTS

Figure 1:
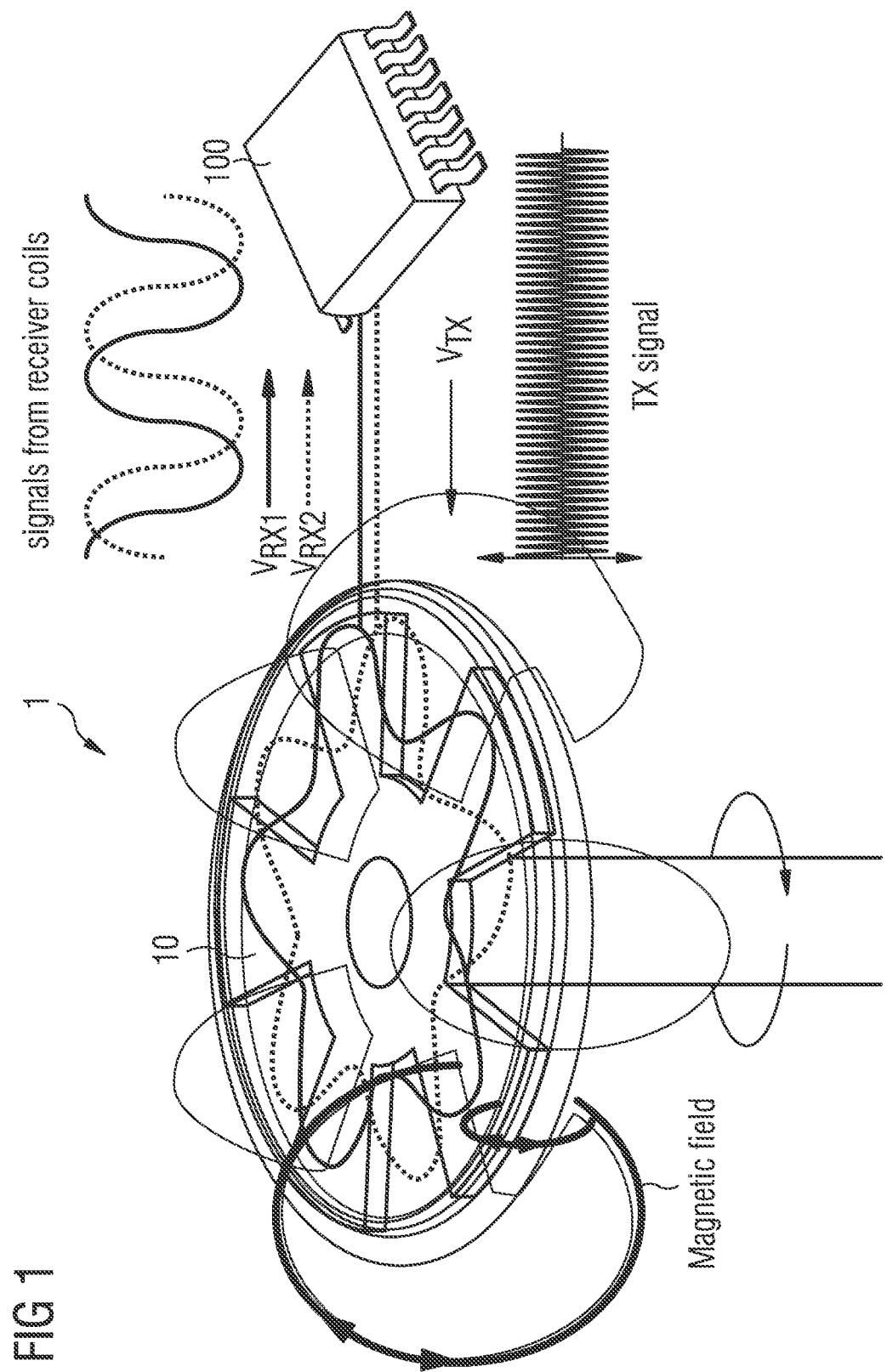
FIG. 1 illustrates the basic principle of an inductive position sensor system.

FIG. 1 shows a system 1 for determining a position of a rotating metal coupler/target 10 by an inductive position sensor device 100. The rotating coupler/target 10 is mounted on a rotating bar. The inductive position sensor device 100 comprises a transmitter terminal to generate a transmitter signal, for example a TX resonator signal. A transmitting antenna coil is coupled to the transmitter terminal. The inductive position sensor device 100 further comprises receiver terminals which are coupled to receiving antenna coils for receiving reception signals $V_{RX1}$, $V_{RX2}$ from the receiving antenna coils.

The transmitter signal/TX resonator signal is fed into the transmitting antenna coil so that an electromagnetic field is generated by the current in the transmitting antenna coil. The inductive position sensor device 100 receives the reception signal $V_{RX1}$ and $V_{RX2}$ from the receiving antenna coils. The reception signals are caused by an electrical current which is induced in the receiving antenna coils by the electromagnetic field. The metal coupler/target 10 rotates in a plane parallel to the receiving antenna coils and thus effects the degree of inductive coupling between the transmitting antenna coil and the receiving antenna coils.

In particular, if a metal coupler/target 10 is placed near the transmitting antenna coil and the receiving antenna coils, the amount of metal area near the two receiving antenna coils is inversely proportional to the amplitude of the reception signals $V_{RX1}$ and $V_{RX2}$. Thus, the reception signals $V_{RX1}$ and $V_{RX2}$ are correlated with the position of the coupler/target 10.

The design of the receiving antenna coils and the coupler/target 10 is shaped to reproduce the first reception signal $V_{RX1}$ as a sinusoidal signal and the second reception signal $V_{RX2}$ as a cosinusoidal signal, thus allowing implementation of an angular measurement by calculating an arctangent of the ratio of the amplitude of the first reception signal $V_{RX1}$ and the second reception signal $V_{RX2}$. The angular measurement allows to determine a rotating angle of the coupler/target 10.

Figure 2:
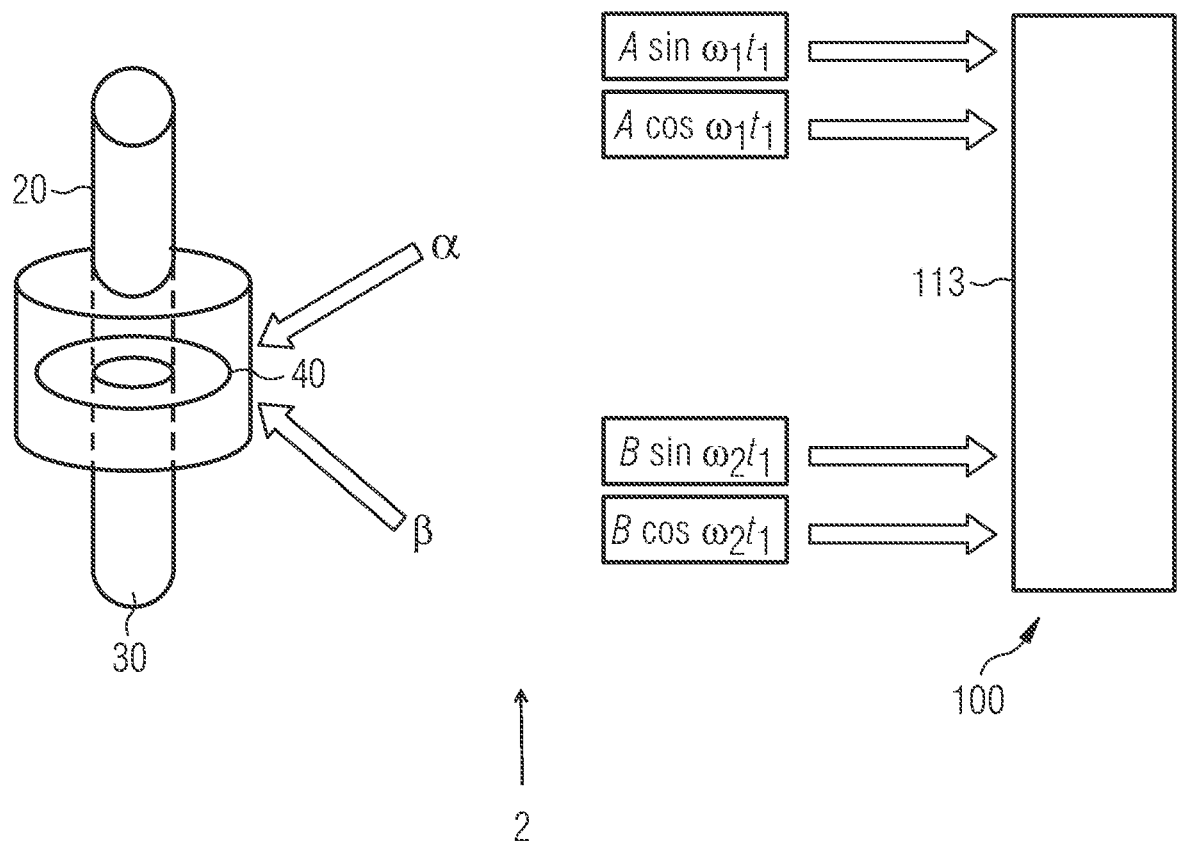
FIG. 2 illustrates the basic principle of determining a torque value in a steering wheel system.

FIG. 2 illustrates the use of an inductive position sensor device 100 in a power-assisted steering wheel system 2 in an automotive application. A power-assisted steering wheel system 2 for a vehicle comprises an inner shaft 20 coupled at one end to a steering wheel, not shown in FIG. 2, and at the other end to a torsion bar 40. The torsion bar 40 transmits steering torque to a steering outer shaft 30. The steering outer shaft 30 is coupled to a steering transmission which turns a steering rack connected to a pair of the vehicle's wheels.

An inductive position sensor device 100 schematically illustrated in FIG. 2 by an evaluation unit 113 is provided to detect an angular displacement between the inner shaft 20 and the outer shaft 30. The evaluation unit of the inductive position sensor device 100 is configured to determine the displacement of an angle α between the inner shaft 20 and the torsion bar 40, and an angle β between the outer shaft 30 and the torsion bar 40. The evaluation unit 113 of the inductive position sensor device 100 then determines the torque value effecting on the steering system by multiplying the determined displacement of the two angles α and β by the stiffness of the torsion bar 40. The torque value is used to control a power steering motor to assist the driver.

The inductive position sensor device 100 is coupled to a first receiving antenna coil for receiving a first reception signal shaped as a sinusoidal signal which may be expressed by the term A sin $\omega_1 t_1$, and to a second receiving antenna coil for receiving a second reception signal formed as a cosinusoidal signal which may be expressed by the term A cos $\omega_1 t_1$. The inductive position sensor device 100 is further coupled to a third receiving antenna coil for receiving a third reception signal shaped as a sinusoidal signal which may be expressed by the term B sin $\omega_2 t_1$, and to a fourth receiving antenna coil for receiving a fourth reception signal shaped as a cosinusoidal signal which may be expressed by the term B cos $\omega_2 t_1$.

The four reception signals can be used by the evaluation unit 113 of the inductive position sensor device 100 to determine the displacement between the inner shaft 20 and the outer shaft 30 connected by means of the torsion bar 40, when the steering shaft is rotated. In particular, the angle α between the inner shaft 20 and the torsion bar 40 may be calculated by:

$$\alpha = arctg\left(\frac{A\sin(\omega_1 t_1)}{A\cos(\omega_1 t_1)}\right)$$

and the angle β between the outer shaft 30 and the torsion bar 40 may be calculated by $$\beta = arctg\left(\frac{B\sin(\omega_2 t_1)}{B\cos(\omega_2 t_1)}\right)$$

The difference of the two angles multiplied by the stiffness of the torsion bar is directly proportional to the force applied to the steering shaft and consequently to the current that has to feed the electric motors of the steering wheel itself.

Figure 3:
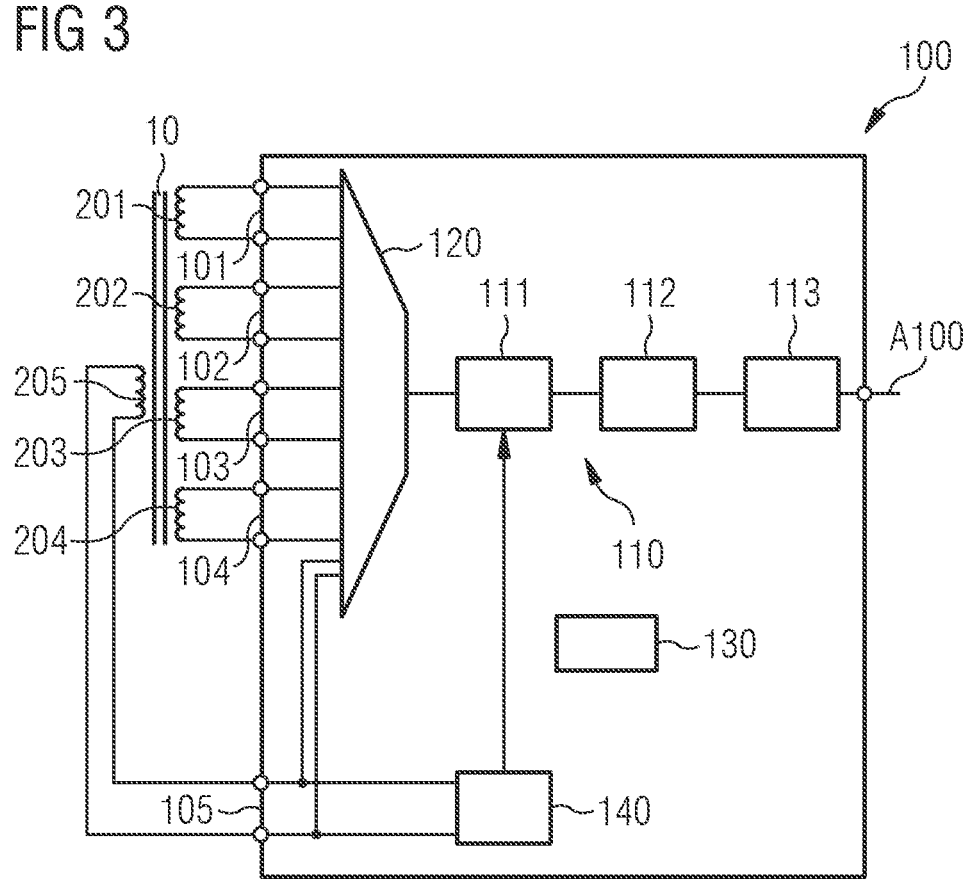
FIG. 3 shows a block diagram of an inductive position sensor device.

FIG. 3 shows an architecture of a cost-effective inductive position sensor device 100 which may be used as a torque sensor. The inductive position sensor device comprises at least a terminal 101 to couple the position sensor device 100 with a first receiving antenna coil 201 for providing a first reception signal, and at least a second terminal 102 to couple the position sensor device 100 with a second receiving antenna coil 202 for providing a second reception signal. The inductive position sensor device 100 further comprises a unique receiver channel 110 to evaluate the first and second reception signal. The inductive position sensor device 100 comprises a multiplexer 120 which is arranged between the at least one first and second terminal 101, 102 and the unique receiver channel 110. The multiplexer 120 is configured to selectively couple the at least one first terminal 101 or the at least one second terminal 102 with the unique receiver channel 110 in dependence on operating the multiplexer 120 in a first or second operation state.

The receiver channel 110 is configured to perform signal processing and to evaluate each of the at least one first and second reception signal fed into the receiver channel in dependence on the operation state of the multiplexer 120. For this purpose, the unique receiver channel 110 comprises a demodulator 111 to provide a first demodulated analogue signal by demodulating the first reception signal, when the multiplexer 120 is operated in the first operation state and thus the demodulator 111 receives the first reception signal at its input side. The demodulator 111 is further configured to provide a second demodulated analogue signal by demodulating the second reception signal, when the multiplexer 120 is operated in the second operation state and thus the second reception signal is applied to the input side of the demodulator 111.

The unique receiver channel 110 further comprises an analogue-to-digital converter 112 that is configured to convert the first demodulated analogue signal into a first digital signal, when the multiplexer 120 is operated in the first operation state. When the multiplexer 120 is operated in the second operation state, the analogue-to-digital converter 112 receives the second demodulated analogue signal at its input side and converts the second demodulated analogue signal into a second digital signal.

The unique receiver channel 110 comprises an evaluation unit 113 to determine a relationship of the first reception signal and the second reception signal. The evaluation unit 113 is configured to calculate a value of an arctangent-function of the relationship of the first reception signal and the second reception signal. For this purpose, the evaluation unit 113 is configured to calculate a relationship of a first signal to be evaluated and a second signal to be evaluated. The first signal to be evaluated by the evaluation unit 113 is a representation of the first reception signal. The second signal to be evaluated by the evaluation unit 113 is a representation of the second reception signal.

The multiplexer 120 is configured to be controlled by a control circuit 130 of the inductive position sensor device so that the first reception signal received at the at least one first terminal 101 at a first time t1 is fed into the unique receiver channel 110 in the first operation state of the multiplexer 120. The multiplexer 120 is further configured to be controlled by the control circuit 130 so that the second reception signal received at the at least one second terminal 102 at a second time t2 is fed into the unique receiver channel 110 in the second operation state of the multiplexer 120.

The inductive position sensor device 100 comprises an oscillator circuit 140 that may be configured as an LC oscillator pushed at its resonance frequency to generate an excitation signal at an output terminal 105 of the position sensor device 100. The output terminal 105 may be coupled to a transmitting antenna coil 205.

The inductive position sensor device 100 may be used to determine a position of a coupler/target 10, for example a rotating angle α of an inner shaft 20 relative to a torsion bar 40 in a steering wheel system. An electromagnetic field generated by a current flowing in the transmitting antenna coil is changed in dependence on the position of the metal coupler/target 10 located between the transmitting antenna coil 205 and the at least one receiving antenna coils 201, 202. As a consequence, a different current is induced in the at least one receiving antenna coil 201 and the at least one receiving antenna coil 202 by the change of the electromagnetic field in dependence on the position of the metal coupler/target 10. The first and the second reception signal respectively have a different amplitude which is dependent on and thus correlates with the position of the coupler/target 10 in the electromagnetic field.

The receiving antenna coils 201 and 202 may be formed such that the first reception signal received by the receiving antenna coil 201 is shaped as a sinusoidal signal being applied to the first terminal 101, and the second reception signal received by the second receiving antenna coil 202 is shaped as a cosinusoidal signal applied to the second terminal 102.

Considering the use of the inductive position sensor device to determine the angle α between the inner shaft 20 and the torsion bar 40, the inductive position sensor device is arranged so that the first reception signal received from the receiving antenna coil 201 at the first terminal 101 and the second reception signal received from the receiving antenna coil 202 at the second terminal 102 is dependent from the position of the inner shaft 20 in relation to the torsion bar 40. The multiplexer 120 is operated such that the first reception signal is fed into the unique receiver channel 110 at the first time t1 and the second reception signal is fed into the unique receiver channel 110 at the second time t2.

The evaluation unit 113 is configured to determine the angle α by calculating the arctangent-function of the relationship of the sinusoidal-shaped first reception signal/the first signal to be evaluated and the cosinusoidal-shaped second reception signal/the second signal to be evaluated.

The inductive position sensor device 100 may be further configured to calculate the angle β between the outer shaft 30 and the torsion bar 40. For this purpose, the inductive position sensor device 100, in the embodiment shown in FIG. 3, comprises at least a third terminal 103 to couple the position sensor device with a third receiving antenna coil 203 for receiving a third reception signal, and at least a fourth terminal 104 to couple the position sensor device with a fourth receiving antenna coil 204 for receiving a fourth reception signal. According to this embodiment, the multiplexer 120 is configured to selectively couple the at least one third terminal 103 or the at least one fourth terminal 104 with the unique receiver channel 110 in dependence on operating the multiplexer 120 in a third or fourth operation state.

The multiplexer 120 is configured to be controlled by the control unit 130 so that the third reception signal received at the at least one third terminal 103 at a third time t3 is fed into the unique receiver channel 110 in the third operation state of the multiplexer 120. The multiplexer 120 is further configured to be controlled by the control unit 130 so that the fourth reception signal received at the at least one fourth terminal 104 at a fourth time t4 is fed into the unique receiver channel 110 in the fourth operation state of the multiplexer 120.

Considering the use of the inductive position sensor device to determine the angle β between the outer shaft 30 and the torsion bar 40, the inductive position sensor device is arranged so that the third reception signal received from the receiving antenna coil 203 at the third terminal 103 and the fourth reception signal received from the receiving antenna coil 204 at the fourth terminal 104 is dependent from the position of the outer shaft 30 in relation to the torsion bar 40.

The third and the fourth receiving antenna coils 203 and 204 are formed such that the third reception signal is shaped as a sinusoidal signal and the fourth reception signal is formed as a cosinusoidal signal. The multiplexer 120 applies the third reception signal at time t3 to the input of the unique receiver channel 110 and applies the fourth reception signal at time t4 to the input of the unique receiver channel 110. The angle β is determined by the evaluation unit 113 by calculating the arctangent-function of the relationship of the third reception signal/a signal representing the third reception signal and the fourth reception signal/a signal representing the fourth reception signal.

The inductive position sensor device 100 thus enables to determine two relative positions, for example angle α between inner shaft 20 and torsion bar 40 and angle β between outer shaft 30 and torsion bar 40 of a steering wheel system, by using a single position sensor device, wherein all components are housed in a single housing of the device. The inductive position sensor device is provided with a full receiver chain comprising, for example, a demodulator, an analogue-to-digital converter and an evaluation unit for signal processing of a plurality of reception signals subsequently applied to the input of the receiver channel 110 by multiplexer 120, thus making possible the time-sharing of the position measurements of the inner and outer shaft by evaluating four signal components, i.e. two sinusoidal-shaped reception signals and two cosinusoidal-shaped reception signals to have the two angles α and β.

The result of the measurement of the position of the coupler/target may be slightly incorrect, because the coupler/target may continue to move during the time elapsed during applying a reception signal to the input side of the receiver channel 110 and evaluating the reception signal by the evaluation unit 113 and providing the result at an output terminal A100 of the device. The position error is caused by a speed and acceleration component of the coupler/target. The change of the position Δα of the coupler/target 10 between the time at which a reception signal is received at one of the terminals 101, . . . , 104 and a result of the evaluation of the reception signal is provided by the evaluation unit 113 at the output terminal A100 is given by $$\Delta\alpha = \tfrac{1}{2}at^2 + vt + \alpha_0$$

The speed—considering it constant—can be compensated by a speed compensation technique described, for example, in US 2016/202089 A1. Regarding the inaccuracy caused by the acceleration, it is acceptable at least in a torque and angle sensing (TAS) application, this being a low speed one.

Nevertheless, the accuracy of the calculation of the angles α and β is effected by the fact that the four needed components of the reception signals are provided to the input side of the receiver channel 110 by the multiplexer 120 not at the same point in time, but in different, subsequent time points t1, t2, t3 and t4, as illustrated in FIG. 4. The accuracy of calculation of the angles α and β can be increased by implementing an interpolation algorithm according to which the angles α and β are calculated by the evaluation unit 113. The interpolation algorithm uses approximation functions, for example Taylor series, for approximating the sinusoidal and cosinusoidal shaped functions of the reception signals. The embodiment of the evaluation unit 113 to implement the interpolation algorithm is explained in the following with reference to FIG. 4.

The evaluation unit 113 is configured to calculate a first approximation function approximating the first reception signal and to calculate a second approximation function approximating the second reception signal. In particular, the evaluation unit 113 is configured to calculate a value of the first approximation function at a first intermediate time t12 being between the first time t1 and the second time t2. The evaluation unit 113 is further configured to calculate a value of the second approximation function at the first intermediate time t12. The first time t1 is the time at which the level of the first reception signal which is evaluated by the receiver channel 100 applies at the first terminal 101. The second time t2 is the time at which the level of the second reception signal which is evaluated by the receiver channel 100 applies at the second terminal 101.

In order to determine angle α at the first intermediate time t12, the evaluation unit 113 is configured to calculate a first value of an arctangent-function of the relationship of the value of the first approximation function and the value of the second approximation function at the first intermediate time t12.

In order to determine angle β, the evaluation unit 113 is configured to calculate a value of a third approximation function approximating the third reception signal at a second intermediate time t34 being between the third time t3 and the fourth time t4. The evaluation unit 113 is further configured to calculate a value of a fourth approximation function approximating the fourth reception signal at the second intermediate time t34. The third time t3 is the time at which the level of the third reception signal which is evaluated by the receiver channel 100 applies at the third terminal 103. The fourth time t4 is the time at which the level of the fourth reception signal which is evaluated by the receiver channel 100 applies at the fourth terminal 104.

In order to determine angle β at the second intermediate time t34, the evaluation unit 113 is configured to calculate a value of an arctangent-function of the relationship of the value of the third approximation function and the value of the fourth approximation function at the second intermediate time t34.

The evaluation unit 113 is further configured to calculate a value of a fifth approximation function approximating the first reception signal at the fourth time t4 and a value of a sixth approximation function approximating the second reception signal at the fourth time t4. Furthermore, the evaluation unit 113 is configured to calculate a value of a seventh approximation function approximating the third reception signal at the fourth time t4 and a value of an eighth approximation function approximating the fourth reception signal at the fourth time t4.

In order to calculate the angle α at the fourth time t4, the evaluation unit 113 is configured to calculate a value of an arctangent-function of the relationship of the value of the fifth approximation function and the value of the sixth approximation function at the fourth time t4. In order to determine angle β at the fourth time t4, the evaluation unit 113 is configured to calculate a value of an arctangent-function of the relationship of the value of the seventh approximation function and the value of the eighth approximation function at the fourth time t4. Regarding the use of the inductive position sensor device in a TAS application, the related torque value affecting a steering shaft of a steering wheel system may be determined by multiplying the displacement of the two angles α and β by the stiffness of the torsion bar.

In order to determine the approximation functions approximating the sinusoidal-shaped and cosinusoidal-shaped reception signals, a Taylor series approach that allow describing a function with an infinite sum of components that are expressed in terms of the functions' derivatives at a single point, can be used. Regarding the Taylor series approach and the sinusoidal/cosinusoidal shaped reception signals, it has to be considered that the value of the sin/cos-function and its derivative are not available in the same point, because the sinusoidal shaped reception signals are measured at a different time with respect to the counterpart cosinusoidal shaped reception signal.

However, the Taylor series approach can be used for "predicting" the angles α and β in different times under the only approximation of constant acceleration. The times t1, t2, t3 and t4 are chosen such that the sequence of measurements of the sinusoidal and cosinusoidal shaped reception signals are taken close together in time. When the approximation functions for the first/third and second/fourth reception signal are calculated at the same intermediate time t12/t34, the value of the sin/cos-function and its derivative are available at the same point in time, and can be used in the Taylor series approach for determine the approximation functions at time t4.

The proposed design of the inductive position sensor device has been discussed for use in TAS applications, but is not limited to be used for this kind of application. Rather, the proposed solution can be implemented in all sensors and systems that are using many times for the same receiver channel/chain and are in the need to compensate for the variation over time.

The embodiments of the inductive position sensor device disclosed herein have been discussed for the purpose of familiarizing the reader with novel aspects of the device. Although preferred embodiments have been shown and described, many changes, modifications, equivalents and substitutions of the disclosed concepts may be made by one having skill in the art without unnecessarily departing from the scope of the claims.

In particular, the design of the inductive position sensor device is not limited to the disclosed embodiments, and gives examples of many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined. Moreover, reference signs used in the claims are not limited to be construed as limiting the scope of the claims.

Furthermore, as used herein, the term "comprising" does not exclude other elements. In addition, as used herein, the article "a" is intended to include one or more than one component or element, and is not limited to be construed as meaning only one.

The invention claimed is:

1. An inductive position sensor device, comprising:
   at least a first terminal to couple the inductive position sensor device with a first receiving antenna coil for providing a first reception signal;
   at least a second terminal to couple the inductive position sensor device with a second receiving antenna coil for providing a second reception signal;
   a unique receiver channel to evaluate the first and second reception signal; and
   a multiplexer being arranged between the at least one first and second terminal and the unique receiver channel, wherein the multiplexer is configured to selectively couple the at least one first terminal or the at least one second terminal with the unique receiver channel in dependence on operating the multiplexer in a first or second operation state,
   wherein the unique receiver channel comprises an evaluation unit to determine a relationship of the first reception signal and the second reception signal by calculating a relationship of a first signal to be evaluated and a second signal to be evaluated, the first signal to be evaluated being a representation of the first reception signal and the second signal to be evaluated being a representation of the second reception signal,
   wherein the evaluation unit is configured to calculate a first approximation function approximating the first reception signal,
   wherein the evaluation unit is configured to calculate a second approximation function approximating the second reception signal,
   wherein the evaluation unit is configured to calculate a value of the first approximation function at a first intermediate time being between a first time and a second time,
   wherein the evaluation unit is configured to calculate a value of the second approximation function at the first intermediate time, and
   wherein the inductive position sensor device determines a position of a device rotating in a plane parallel to the first receiving antenna coil and the second receiving antenna coil, the position being based on the value of the first approximation function and the value of the second approximation function.

2. The inductive position sensor device of claim 1, wherein the unique receiver channel comprises a demodulator to provide a first demodulated analogue signal, when the multiplexer is operated in the first operation state, and to provide a second demodulated analogue signal, when the multiplexer is operated in the second operation state.

3. The inductive position sensor device of claim 1, wherein the unique receiver channel comprises an analogue-to-digital converter being configured to convert the first demodulated analogue signal in a first digital signal, when the multiplexer is operated in the first operation state, and to convert the second demodulated analogue signal in a second digital signal, when the multiplexer is operated in the second operation state.

4. The inductive position sensor device of claim 1, wherein the multiplexer is configured to be controlled so that the first reception signal received at the at least one first terminal at the first time is fed into the unique receiver channel in the first operation state of the multiplexer, and
wherein the multiplexer is configured to be controlled so that the second reception signal received at the at least one second terminal at the second time is fed into the unique receiver channel in the second operation state of the multiplexer.

5. The inductive position sensor device of claim 1, wherein the evaluation unit is configured to calculate a value of an arctangent-function of the relationship of the first signal to be evaluated and the second signal to be evaluated.

6. The inductive position sensor device of claim 1, wherein the evaluation unit is configured to calculate a first value of an arctangent-function of the relationship of the value of the first approximation function and the value of the second approximation function at the first intermediate time.

7. The inductive position sensor device of claim 1, comprising:
- at least a third terminal to couple the position sensor device with a third receiving antenna coil for receiving a third reception signal; and
- at least a fourth terminal to couple the position sensor device with a fourth receiving antenna coil for receiving a fourth reception signal,
- wherein the multiplexer is configured to selectively couple the at least one third terminal or the at least one fourth terminal with the unique receiver channel in dependence on operating the multiplexer in a third or fourth operation state.

8. The inductive position sensor device of claim 7,
- wherein the multiplexer is configured to be controlled so that the third reception signal received at the at least one third terminal at a third time is fed into the unique receiver channel in the third operation state of the multiplexer, and
- wherein the multiplexer is configured to be controlled so that the fourth reception signal received at the at least one fourth terminal at a fourth time is fed into the unique receiver channel in the fourth operation state of the multiplexer.

9. The inductive position sensor device of claim 8,
- wherein the evaluation unit is configured to calculate a value of a third approximation function approximating the third reception signal at a second intermediate time being between the third time and the fourth time, and
- wherein the evaluation unit is configured to calculate a value of a fourth approximation function approximating the fourth reception signal at the second intermediate time.

10. The inductive position sensor device of claim 9,
- wherein the evaluation unit is configured to calculate a value of an arctangent-function of the relationship of the value of the third approximation function and the value of the fourth approximation function at the second intermediate time.

11. The inductive position sensor device of claim 8,
- wherein the evaluation unit is configured to calculate a value of a fifth approximation function approximating the first reception signal at the fourth time and a value of a sixth approximation function approximating the second reception signal at the fourth time, and
- wherein the evaluation unit is configured to calculate a value of a seventh approximation function approximating the third reception signal at the fourth time and a value of an eighth approximation function approximating the fourth reception signal at the fourth time.

12. The inductive position sensor device of claim 11,
- wherein the evaluation unit is configured to calculate a value of an arctangent-function of the relationship of the value of the fifth approximation function and the value of the sixth approximation function at the fourth time, and
- wherein the evaluation unit is configured to calculate a value of an arctangent-function of the relationship of the value of the seventh approximation function and the value of the eighth approximation function at the fourth time.

* * * * *